United States Patent
Wang et al.

(10) Patent No.: US 10,716,008 B2
(45) Date of Patent: Jul. 14, 2020

(54) METHODS AND NODES FOR REDUCING INTERFERENCE IN A WIRELESS COMMUNICATIONS NETWORK

(71) Applicant: Telefonaktiebolaget LM Ericsson (publ), Stockholm (SE)

(72) Inventors: Yu Wang, Solna (SE); Andreas Bergström, Linköping (SE); Filip Mestanov, Sollentuna (SE); Soma Tayamon, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/078,421

(22) PCT Filed: Mar. 9, 2016

(86) PCT No.: PCT/SE2016/050187
§ 371 (c)(1),
(2) Date: Aug. 21, 2018

(87) PCT Pub. No.: WO2017/155436
PCT Pub. Date: Sep. 14, 2017

(65) Prior Publication Data
US 2019/0053062 A1    Feb. 14, 2019

(51) Int. Cl.
*H04W 16/14*    (2009.01)
*H04W 52/24*    (2009.01)
(Continued)

(52) U.S. Cl.
CPC ........... *H04W 16/14* (2013.01); *H04W 16/10* (2013.01); *H04W 52/143* (2013.01);
(Continued)

(58) Field of Classification Search
CPC . H04W 16/14; H04W 52/247; H04W 52/243; H04W 52/143; H04W 16/10;
(Continued)

(56) References Cited

U.S. PATENT DOCUMENTS 4,938,657 A    7/1990 Benson et al.
2005/0233703 A1    10/2005 Fukui et al.
(Continued)

FOREIGN PATENT DOCUMENTS

EP    0422914 A2    4/1991
JP    H04-179322 A    6/1992
(Continued)

OTHER PUBLICATIONS

Ma, H., et al., "On Loss Differentiation for CSMA-Based Dense Wireless Network", IEEE Communications Letters, vol. 11, No. 11, Nov. 2007, pp. 877-879.

*Primary Examiner* — Omar J Ghowrwal
(74) *Attorney, Agent, or Firm* — Murphy, Bilak & Homiller, PLLC (57) ABSTRACT

A method performed by a transmitting node (110) for reducing interference in a wireless communications network (100) is provided. The transmitting node (110) receives information indicating that inference caused by an interfering node (111) to a transmission signal from the transmitting node (110) fulfills a timing condition relative to the reception of 5 the transmission signal in a receiving node (121) in the wireless communications network (100). Then, the transmitting node (110) adjusts one or more transmission parameters in the transmitting node (110) based on the received information. A transmitting node (110) is also provided. Furthermore, an interfering node (111) and a method therein for reducing 10 interference in a wireless communications network (100) are also provided, as well as, a receiving node (121) and a method therein for reducing interference in a wireless communications network (100).

30 Claims, 5 Drawing Sheets

(51) Int. Cl.
*H04W 16/10* (2009.01)
*H04W 74/08* (2009.01)
*H04W 52/14* (2009.01)
*H04W 84/12* (2009.01)
*H04W 80/02* (2009.01)

(52) U.S. Cl.
CPC ....... *H04W 52/243* (2013.01); *H04W 52/247* (2013.01); *H04W 74/0816* (2013.01); *H04W 80/02* (2013.01); *H04W 84/12* (2013.01)

(58) Field of Classification Search
CPC .. H04W 74/0816; H04W 84/12; H04W 80/02
See application file for complete search history.

(56) References Cited

U.S. PATENT DOCUMENTS

| | | |
|---|---|---|
| 2008/0144493 A1 | 6/2008 | Yeh |
| 2009/0131067 A1 | 5/2009 | Aaron et al. |
| 2009/0296591 A1 | 12/2009 | Urabe et al. |
| 2012/0238312 A1 | 9/2012 | Liu |
| 2014/0198872 A1 | 7/2014 | Barriac et al. |
| 2016/0174165 A1 | 6/2016 | Ikenaga et al. |

FOREIGN PATENT DOCUMENTS

| | | |
|---|---|---|
| JP | 2003219459 A | 7/2003 |
| JP | 2005295107 A | 10/2005 |
| JP | 2010161535 A | 7/2010 |
| JP | 2013512630 A | 4/2013 |
| WO | 2012112807 A1 | 8/2012 |
| WO | 2015015891 A1 | 2/2015 |
| WO | 2015142932 A1 | 9/2015 |

METHODS AND NODES FOR REDUCING INTERFERENCE IN A WIRELESS COMMUNICATIONS NETWORK

TECHNICAL FIELD

Embodiments herein relate to reducing interference in a wireless communications network. In particular, embodiments herein relate to a transmitting node and method therein for reducing interference in a wireless communications network, as well as, a interfering node and method therein for reducing interference in a wireless communications network. Embodiments herein further relate to a receiving node and method therein for reducing interference in a wireless communications network.

BACKGROUND

The standardized IEEE 802.11 Wireless LAN, WLAN, also referred to as a Wi-Fi network, is a wireless communications network technology that operates on unlicensed frequency bands. Currently, the standardized IEEE 802.11 WLAN operate mainly on the 2.4 GHz and/or the 5 GHz band. The standard specifications regulate the Physical, PHY, layer, Medium Access Control, MAC, layer, and other aspects of the nodes therein to secure their compatibility and inter-operability.

In the standardized IEEE 802.11 WLAN, a Basic Serving Set, BSS, is regarded the basic building block of the wireless communications network. The BSS comprise a number of nodes; normally, at least one Access Point, AP, and a number of stations, STAs, located within a certain coverage area or cell being served by the at least one AP. Here, it should also be noted that STAs that are located within an overlapping coverage area of two or more BSSs may also be referred to as STAs having an Overlapping Basic Service Set, OBSS.

Within a BSS/OBSS, the coordination of the transmissions between the at least one AP and the STAs is typically performed in a distributed manner using the Distribute Coordination Function, DCF. This means that before a transmission, a STA first performs a Clear Channel Assessment, CCA, by sensing the channel for a specific period of time. If the channel is deemed idle, then the STA transmits; otherwise, the STA typically has to wait a random back-off period and then again check whether the channel is idle and thus available for transmission. The random back-off period is commonly implemented by a back-off timer being set to a random time chosen uniformly between 0 and the current contention window, CW, size in the STA. The random back-off period also provides a collision avoidance mechanism for multiple STAs that wish to transmit in the same BSS. This may also be commonly referred to as Carrier Sensing Multiple Access with Collision Avoidance, CSMA/CA.

Additionally, this procedure for the coordination of the transmissions within the BSS/OBSS may further comprise a Request-To-Send/Clear-To-Send, RTS/CTS, exchange procedure. In this case, a transmitting node, e.g. AP or STA, requests access to the channel explicitly by sending a so-called RTS message and requires a reception of a so-called CTS message from the intended receiving node, e.g. AP or STA, before performing the data transmission. During the RTS/CTS message exchange, essentially all messages, i.e. RTS, CTS, Data and Control Signalling messages, which are transmitted will comprise a NAV timer value. The NAV time values specifies the remaining duration of the entire data packet transmission. Other nodes in the BSS/OBSS, e.g. APs or STAs, which also receives these messages will then set their internal NAV timer with a corresponding value. The internal NAV timer will then, while running, mark the channel as being busy.

One improvement that may be introduced in future WLAN standards is the adjustments of the sensing threshold for the Clear Channel Assessment, CCA. This sensing threshold may be referred to as the Clear Channel Assessment Threshold, CCAT. The CCAT is used to assess whether the channel is busy or idle in that the channel is deemed busy in case a received signal strength level of a transmission surpasses the CCAT, or deemed idle in case a received signal strength level of a transmission do not surpass the CCAT.

With the use of a static CCAT, a node in the BSS/OBSS may refrain from accessing the channel in case it is exposed to concurrent transmissions in neighbouring BSSs, even though simultaneous transmissions would be possible, i.e. the interference caused by the simultaneous transmissions on each other would be at a tolerable level. This has the disadvantage of limiting the number of simultaneous transmissions that may be performed in the BSS/OBSS at any given time. In turn, this will also limit the performance of the wireless communications network by not fully utilizing the available channel; especially, as the CCAT used today is conservatively set to the very low value, such as, e.g. −82 dBm.

Instead, if a node in the BSS/OBSS, i.e. STAs or APs, could dynamically and individually adapt its CCAT, then the amount of concurrent transmissions in the wireless communications network may be increased without significantly increasing the probability of collisions within the BSS/OBSS. In other words, the utilization of the channel would increase without a deterioration of the performance of the wireless communications network. Therefore, an adaptive channel access mechanism has been proposed IEEE 802.11-15/0132r8, "Specification Framework for TGax".

In this adaptive channel access mechanism, each node in the BSS/OBSS may adaptively adjust its COAT depending on the current situation. Some studies have shown that adjusting the COAT to a more aggressive value, e.g. a higher value than −82 dBm, may provide an increase in throughput for both the mean and $5^{th}$ percentile worst performing cell-edge nodes. However, while spatial reuse features in the WLAN may improve efficiency of the wireless communications network, it will also increase the interference level in the entire wireless communications network. The characteristic of this interference may be very time dynamic depending on the transmission pattern of the node causing the inference. Such time dynamic interferences brings challenges to the design of link adaptation and may cause high packet loss rate if the link adaptation fails to adjust the Modulation and Coding Scheme, MCS, according to the level of the interference. Consequently, this high packet loss rate may result in both reduced user throughput and higher transmission latency, which leads to a decrease in transmission performance in the wireless communications network.

SUMMARY

It is an object of embodiments herein to improve transmission performance in a wireless communications network.

According to a first aspect of embodiments herein, the object is achieved by a method performed by a transmitting node for reducing interference in a wireless communications network. The transmitting node receives information indicating that inference caused by an interfering node to a transmission signal from the transmitting node fulfills a timing condition relative to the reception of the transmission signal in a receiving node in the wireless communications network. Then, the transmitting node adjusts one or more transmission parameters in the transmitting node based on the received information.

According to a second aspect of embodiments herein, the object is achieved by a transmitting node for reducing interference in a wireless communications network. The transmitting node is configured to receive information indicating that inference caused by an interfering node to a transmission signal from the transmitting node fulfills a timing condition relative to the reception of the transmission signal in a receiving node in the wireless communications network. The transmitting node is also configured to adjust one or more transmission parameters in the transmitting node based on the received information.

According to a third aspect of embodiments herein, the object is achieved by a method performed by an interfering node for reducing interference in a wireless communications network. The interfering node receives information indicating that inference caused by the interfering node to a transmission signal from a transmitting node fulfills a timing condition relative to the reception of the transmission signal in a receiving node in the wireless communications network. Then, the interfering node adjusts one or more transmission parameters in the interfering node based on the received information.

According to a fourth aspect of embodiments herein, the object is achieved by an interfering node for reducing interference in a wireless communications network. The interfering node is configured to receive information indicating that inference caused by the interfering node to a transmission signal from a transmitting node fulfills a timing condition relative to the reception of the transmission signal in a receiving node in the wireless communications network. The interfering node is also configured to adjust one or more transmission parameters in the interfering node based on the received information.

According to a fifth aspect of embodiments herein, the object is achieved by a method performed by a receiving node for reducing interference in a wireless communications network. The receiving node determines information indicating that inference caused by an interfering node to a transmission signal from a transmitting node fulfills a timing condition relative to the reception of the transmission signal in the receiving node. Then, the receiving node transmits the determined information to the interfering node and/or to the transmitting node.

According to a sixth aspect of embodiments herein, the object is achieved by a receiving node for reducing interference in a wireless communications network. The receiving node is configured to determine information indicating that inference caused by an interfering node to a transmission signal from a transmitting node fulfills a timing condition relative to the reception of the transmission signal in the receiving node. The receiving node is also configured to transmit the determined information to the interfering node and/or to the transmitting node.

By characterising an interference based on a timing condition relative to the reception of a transmission signal in a receiving node, i.e. based on a relationship between the point in time at which a transmitted signal is received by a receiving node and the point in time when an interference received by the same receiving node, and confer this information to the transmitting node transmitting the transmission signal and/or to the interfering node causing the interference, the transmitting node and/or the interfering node are enabled to be more or less conservative in its spatial reuse in the wireless communications network in order to avoid increased inference in the wireless communications network. For example, by being informed about whether the interference experienced by a receiving node is received before, at the same time or after the time of reception of the transmission signal, different actions may be taken by the transmitting node and/or interfering node to adjust its spatial reuse parameters in order to reduce the interference experienced by the receiving node. This means that data packet loss due to high interference may be avoided in the wireless communications network, and that the overall packet loss in the wireless communications network may be reduced. Thus, the efficiency of the wireless communications network may be increased without generating a high level of interference in the wireless communications network.

Hence, transmission performance in a wireless communications network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

The figures are schematic and simplified for clarity, and they merely show details which are essential to the understanding of the embodiments presented herein, while other details have been left out. Throughout, the same reference numerals are used for identical or corresponding parts or steps.

Figure 1:
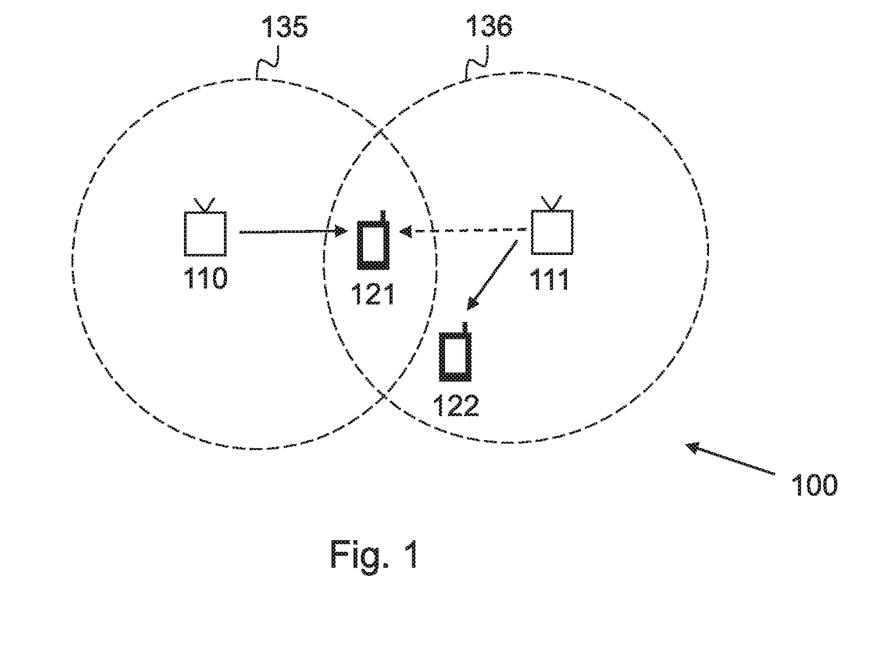
FIG. 1 is a schematic block diagram illustrating embodiments of a transmitting node, an interfering node and a receiving node in a wireless communications network.

FIG. 1 shows an example of a wireless communications network 100 in which embodiments herein may be implemented. The wireless communications network 100 in FIG. 1 comprise two Wireless Local Area Networks, WLANs, i.e. a first WLAN 135 and a second WLAN 136. It should be noted that this is for illustrative purposes only, and that any number of WLANs may be comprised in the wireless communications network 100.

The first and second WLAN 135, 136 each comprise one or more Access Points, APs, configured to provide WLAN coverage and serve stations, STAs, located within their respective coverage area or cell. For example, the first WLAN 135 may comprise a first AP 110 and the second WLAN 136 may comprise a second AP 111. The first and second AP 110, 111 may be configured to provide WLAN coverage and serve stations, STAs, located within their coverage area or cell, respectively, as shown by the dashed areas in FIG. 1. The first and second WLAN 135, 136 may be standardized IEEE 802.11 WLANs.

In some cases, the first and/or second AP 110, 111 of the first and second WLAN 135, 136, may also be network nodes or base stations forming part of a cellular, wireless or radio communication system further providing radio coverage to the STAs 121, 122 over cellular transmission resources. Examples of such cellular, wireless or radio communication systems are, for example, LTE, LTE-Advanced, Wideband Code-Division Multiple Access (WCDMA), Global System for Mobile communications/Enhanced Data rate for GSM Evolution (GSM/EDGE), Worldwide Interoperability for Microwave Access (WI-MAX), Ultra Mobile Broadband (UMB) or GSM network, or other cellular networks or systems. Here, the network nodes or base stations may e.g. be an eNB, eNodeB, or a Home Node B, a Home eNode B, femto Base Station (BS), pico BS or any other network unit capable to serve wireless devices or STAs on cellular transmission resources in the wireless communications network 100. The network node 110 may also be e.g. a radio base station, a base station controller, a network controller, a relay node, a repeater, a Ultra-Dense Network/Software-Defined Network (UDN/SDN) radio access node, a Remote Radio Unit (RRU) or a Remote Radio Head (RRH). This means that the first and/or second AP 110, 111 of the first and second WLAN 135, 136, may be network nodes or base stations further configured to use contention-based transmission resources of the same frequency, such as, e.g. using the unlicensed frequency spectrum convention used for WLANs. Some examples may comprise License Assisted Access, LAA, in LTE, also referred to as LAA-LTE, or LTE Unlicensed, LTE-U. The unlicensed spectrum may also be referred to as unlicensed frequency bands which are shared, decentralized and not licensed to a particular type of scheduled wireless or radio communication.

In the example scenario shown in FIG. 1, a first STA 121 is located in the overlapping area of the coverage areas or cells of the first and second WLAN 135, 136. Also, a second STA 122 is located in the cell of the second WLAN 136. The STAs 121, 122 may e.g. be any kind of station or wireless device capable of communication via a WLAN. For example, the STAs 121, 122 may be a mobile phone, a cellular phone, a Personal Digital Assistant (PDA), a smart phone, a tablet, a sensor or actuator with wireless communication capabilities, a sensor or actuator connected to or equipped with a wireless device, a Machine Device (MD), a Machine-Type-Communication (MTC) device, a Machine-to-Machine (M2M) communication device, a wireless device with D2D capability, a Customer-Premises Equipment (CPE), a Laptop-Mounted Equipment (LME), a Laptop-Embedded Equipment (LEE), etc. In the example scenario shown in FIG. 1, the first STA 121 may be said to form part of a first Basic Service Set, BSS, together with the first AP 110 of the first WLAN 135. Also, the second STA 122 may be said to form part of a second Basic Service Set, BSS, together with the second AP 111 of the second WLAN 136. Further, due to the overlapping coverage areas or cells, the first and second WLAN 135, 136 may also be said to form an Overlapping BSS, OBSS.

Furthermore, in the example scenario shown in FIG. 1, the first AP 110 performs a downlink transmission to the first STA 121 in the first WLAN 135. Simultaneously, the second AP 111 performs downlink transmission to the second STA 122 in the second WLAN 136 which causes interference at the first STA 121. This may cause data packets of the downlink transmission from the first AP 110 to be lost, i.e. not able to be decoded correctly by the first STA 121. However, it should be noted that although embodiments below may be described with reference to the example scenario shown in FIG. 1, this should not be construed as limiting to the embodiments herein, but merely as an example made for illustrative purposes.

For the embodiments described herein, it should be noted that when referring to either one of a transmitting node, an interfering node or a receiving node, any one of the first STA 121, second STA 122, first AP 110 or second AP 111 in the wireless communications network 100 may be intended. However, for the sake of simplicity and in correspondence with the example scenario shown in FIG. 1, the transmitting node is exemplified by the first AP 110, the interfering node is exemplified by the second AP 111, and the receiving node is exemplified by the first STA 121.

Figure 2:
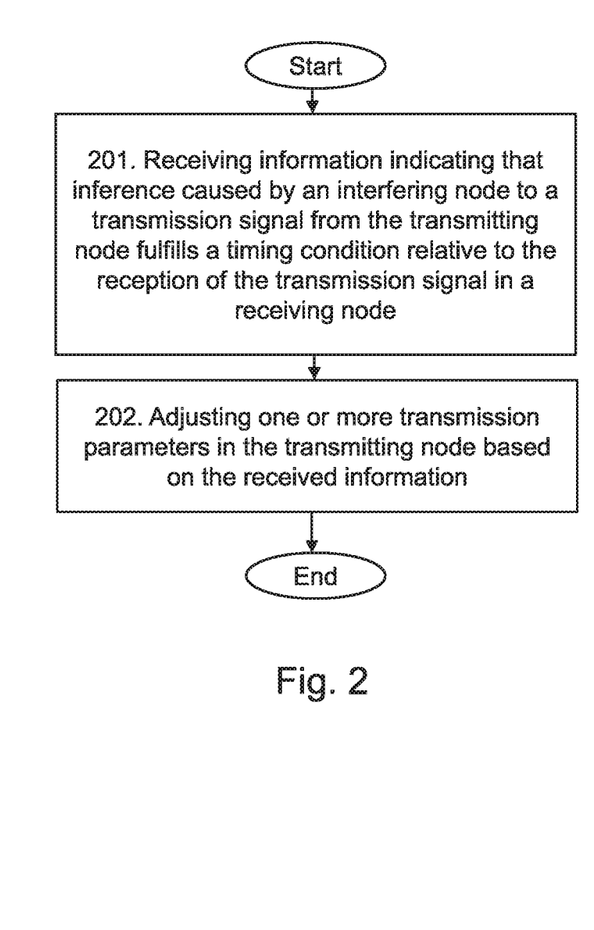
FIG. 2 is a flowchart depicting embodiments of a method in a transmitting node.

Example of embodiments of a method performed by a transmitting node 110 for reducing interference in a wireless communications network 100 will now be described with reference to the flowchart depicted in FIG. 2. FIG. 2 is an illustrated example of actions or operations which may be taken by any one of the first and second STA 121, 122 or the first and second AP 110, 111 that is transmitting data in the wireless communication network 100. The method may comprise the following actions.

Action 201

The transmitting node 110 receives information indicating that inference caused by an interfering node 111 to a transmission signal from the transmitting node 110 fulfills a timing condition relative to the reception of the transmission signal in a receiving node 121 in the wireless communications network 100. This means that the transmitting node 110 may be made aware of how the inference causes packet loss in the receiving node 121 in the wireless communications network 100.

The information may be received by the transmitting node 110 in a report message from the receiving node 121. The report message may, for example, be conveyed via a new dedicated management, control or action frame transmitted from the receiving node 121 or conveyed via existing management frames from the receiving node 121 in the wireless communications network 100. Optionally, the report message may be conveyed by being comprised in MAC headers of data transmissions from the receiving node 121 to the transmission node 110. It should also be noted that the report message from the receiving node 121 may not necessarily be received by the transmission node 110 directly from the receiving node 121, but may, for example, be relayed via another STA, AP or other node in the wireless communications network 100.

In some embodiments, the timing condition may be that the inference is received earlier than the reception of the transmission signal in the receiving node 121, or that the inference is received at the same time as the reception of the transmission signal in the receiving node 121, or that the inference is received later than the reception of the transmission signal in the receiving node 121. This may provide a characterisation of the received interference with enough granularity for taking different actions to adjust spatial reuse parameters in the wireless communications network 100 in order to reduce the overall interference. In other words, the timing condition may be defined as a relationship between the point in time at which the transmitted signal is received by the receiving node 121 and the point in time when the interference is received by the receiving node 121.

According to some embodiments, the information received by the transmitting node 110 may comprise statistics collected by the receiving node 121 for the occurrence of the different timing conditions for the received interference in the receiving node 121. In this case, the transmitting node 110 may, from these statistics, identify whether or not a particular timing condition is most dominant, i.e. relatively more frequently occurring than the other timing conditions. Alternatively, the information received by the transmitting node 110 may comprise an indication of which timing condition is most dominant. One example of such an indication may be a one bit flag being used to represent each identified timing condition, i.e. the flag may be set to true when a particular timing condition has been identified as the most dominant one by the receiving node 121.

Action 202

After receiving the information in Action 201, the transmitting node 110 adjusts one or more transmission parameters in the transmitting node 110 based on the received information. This means that by being informed about how the inference causes packet loss in the receiving node 121 in the wireless communications network 100, the transmitting node 110 may adjust its spatial reuse parameters in order to reduce the interference experienced by the receiving node 121.

In some embodiments, when the timing condition indicates that the inference is received earlier than the transmission signal in the receiving node 121, the transmitting node 110 may decrease a channel sensing threshold in the transmitting node 110. This may be performed in order to avoid transmissions in the presence of interference. For example, the transmitting node 110 may check if a sensing threshold, e.g. a Clear Channel Assessment, CCA, threshold, has been increased for the transmission signal transmitted to the receiving node 121. If so, the transmitting node 110 may decrease the sensing threshold. Alternatively, or additionally, the transmitting node 110 may also increase the transmission power of transmission signals transmitted from the transmitting node 110 when the timing condition indicates that the inference is received earlier than the transmission signal in the receiving node 121. This may be performed in order to increase the SINR at the receiving node 121.

In some embodiments, when the timing condition indicates that the inference is received later than the reception of transmissions in the receiving node 121, the transmitting node 110 may initiate a Request-to-Transmit/Clear-to-Transmit, RTS/CTS, procedure in the wireless communications network 100. This may be performed in order to avoid potential hidden node problems in the wireless communications network 100. Alternatively, or additionally, the transmitting node 110 may increase the transmission power of transmission signals from the transmitting node 110 when the timing condition indicates that the inference is received later than the reception of transmissions in the receiving node 121. This may be performed in order to increase the SINR at the receiving node 121.

In some embodiments, when the timing condition indicates that the inference is received at the same time as the reception of the transmission signal in the receiving node 121, the transmitting node 110 may increase a contention window size in the transmitting node 110, e.g. by doubling the size of its contention window. The contention window, CW, size helps control the possible random back-off periods in the transmitting node 110. This may be performed in order to reduce the collision possibility of transmissions in the wireless communications network 100.

In some embodiments, the transmitting node 110 may also be configured to transmit or forward the report message from the receiving node 121 to an interfering node 111, e.g. in another neighbouring BSS. This may be performed by using a wired or radio link between the transmitting node 110 and the interfering node 111. Alternatively, the transmitting node 110 may use another node, such as, e.g. the second STA 122 in FIG. 1, as a relay between the transmitting node 110 and the interfering node 111. The transmitting node 110 may, for example, determine the identity of the interfering node 111 by decoding the preamble of the interference.

Figure 3:
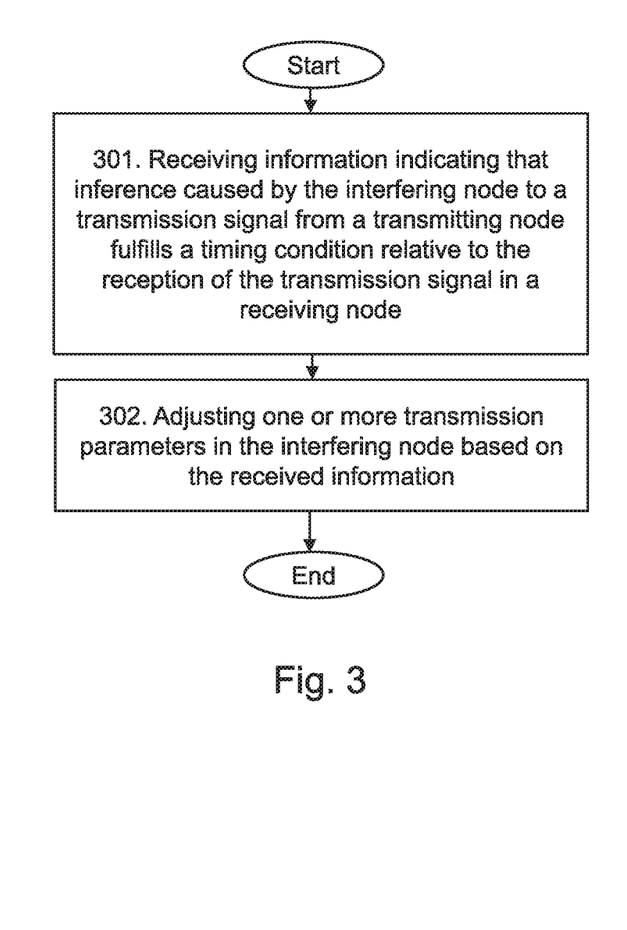
FIG. 3 is a flowchart depicting embodiments of a method in an interfering node.

Example of embodiments of a method performed by an interfering node 111 for reducing interference in a wireless communications network 100 will now be described with reference to the flowchart depicted in FIG. 3. FIG. 3 is an illustrated example of actions or operations which may be taken by any one of the STA 121, the AP 110, or AP 111 that is causing interference to a transmission in the wireless communication network 100. The method may comprise the following actions.

Action 301

The interfering node 111 receives information indicating that inference caused by the interfering node 111 to a transmission signal from a transmitting node 110 fulfills a timing condition relative to the reception of the transmission signal in a receiving node 121 in the wireless communications network 100. This means that the interfering node 111 may be made aware of that its transmissions are causing packet loss in the receiving node 121 in the wireless communications network 100.

The information may be received by the interfering node 111 in a report message from the receiving node 121. The report message may, for example, be conveyed via a new dedicated management, control or action frame transmitted from the receiving node 121 or conveyed via existing management frames from the receiving node 121 in the wireless communications network 100. Optionally, the report message may be conveyed by being comprised in MAC headers of data transmissions from the receiving node 121 to the interfering node 111. It should also be noted that the report message from the receiving node 121 may not necessarily be received by the interfering node 111 directly from the receiving node 121, but may, for example, be relayed via another STA, AP or other node in the wireless communications network 100.

In some embodiments, the timing condition may be that the inference is received earlier than the reception of the transmission signal in the receiving node 121, or that the inference is received at the same time as the reception of the transmission signal in the receiving node 121, or that the inference is received later than the reception of the transmission signal in the receiving node 121. This may provide a characterisation of the received interference with enough granularity for taking different actions to adjust spatial reuse parameters in the wireless communications network 100 in order to reduce the overall interference. In other words, the timing condition may be defined as a relationship between the point in time at which the transmitted signal is received by the receiving node 121 and the point in time when the interference is received by the receiving node 121.

According to some embodiments, the information received by the interfering node 111 may comprise statistics collected by the receiving node 121 for the occurrence of the different timing conditions for the received interference in the receiving node 121. In this case, the interfering node 111 may, from these statistics, identify whether or not a particular timing condition is most dominant, i.e. relatively more frequently occurring than the other timing conditions. Alternatively, the information received by the interfering node 111 may comprise an indication of which timing condition is most dominant. One example of such an indication may be a one bit flag being used to represent each identified timing condition, i.e. the flag may be set to true when a particular timing condition has been identified as the most dominant one by the receiving node 121.

Action 302

After the reception in Action 301, the interfering node 111 adjusts one or more transmission parameters in the interfering node 111 based on the received information. This means that by being informed about how the inference causes packet loss in the receiving node 121 in the wireless communications network 100, the interfering node 111 may adjust its spatial reuse parameters in order to reduce the interference experienced by the receiving node 121.

In some embodiments, when the timing condition indicates that the inference is received earlier than the transmission signal in the receiving node 121, the interfering node 111 may initiate a Request-to-Transmit/Clear-to-Transmit, RTS/CTS, procedure in the wireless communications network 100. This may be performed in order to avoid potential hidden node problems in the wireless communications network 100. Alternatively, or additionally, the interfering node 111 may decrease the transmission power of transmission signals from the interfering node 111 when the timing condition indicates that the inference is received earlier than the transmission signal in the receiving node 121. This may be performed in order to increase the SINR at the receiving node 121.

In some embodiments, when the timing condition indicates that the inference is received later than the reception of transmissions in the receiving node 121, the interfering node 111 may decrease a channel sensing threshold. This may be performed in order to avoid creating interference to other transmissions in the wireless communications network 100. For example, the interfering node 111 may check if a sensing threshold, e.g. a Clear Channel Assessment, CCA, threshold, has been increased for the transmission signal transmitted to the receiving node 121. If so, the interfering node 111 may decrease the sensing threshold. Alternatively, or additionally, the interfering node 111 may decrease the transmission power of transmission signals from the interfering node 111 when the timing condition indicates that the inference is received later than the reception of transmissions in the receiving node 121. This may be performed in order to increase the SINR at the receiving node 121.

In some embodiments, when the timing condition indicates that the inference is received at the same time as the reception of the transmission signal in the receiving node 121, the interfering node 111 may increase a contention window size in the interfering node 111, e.g. by doubling the size of its contention window. The contention window, CW, size helps control the possible random back-off periods in the interfering node 111. This may be performed in order to reduce the collision possibility of transmissions in the wireless communications network 100.

Figure 4:
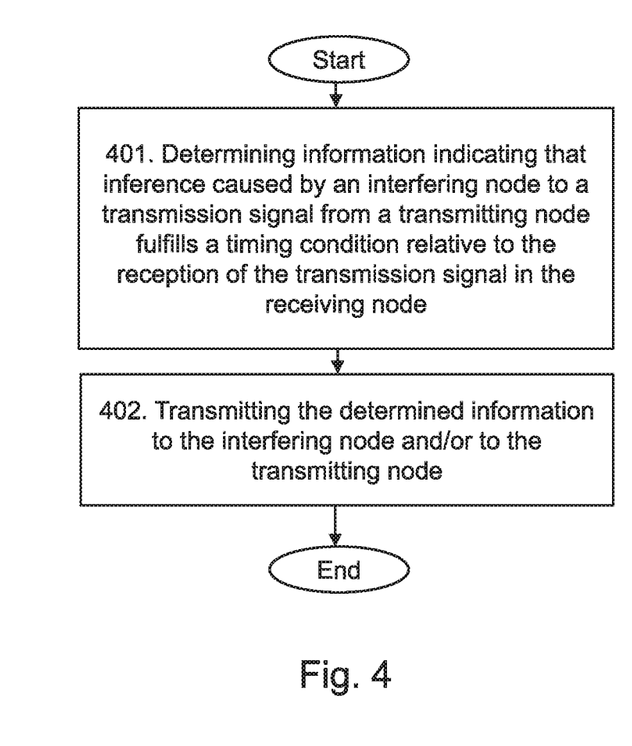
FIG. 4 is a flowchart depicting embodiments of a method in a receiving node.

Example of embodiments of a method performed by a receiving node 121 for reducing interference in a wireless communications network 100 will now be described with reference to the flowchart depicted in FIG. 4. FIG. 4 is an illustrated example of actions or operations which may be taken by any one of the STA 121, the AP 110, or AP 111 that is receiving data in the wireless communication network 100. The method may comprise the following actions.

Action 401

The receiving node 121 determines information indicating that inference caused by an interfering node 111 to a transmission signal from a transmitting node 110 fulfills a timing condition relative to the reception of the transmission signal in the receiving node 121. This means that the receiving node 121 may determine how the inference causes packet loss in the receiving node 121.

In some embodiments, the timing condition may be that the inference is received earlier than the reception of the transmission signal in the receiving node 121, or that the inference is received at the same time as the reception of the transmission signal in the receiving node 121, or that the inference is received later than the reception of the transmission signal in the receiving node 121. This may provide a characterisation of the received interference with enough granularity for taking different actions to adjust spatial reuse parameters in the wireless communications network 100 in order to reduce the overall interference. In other words, the timing condition may be defined as a relationship between the point in time at which the transmitted signal is received by the receiving node 121 and the point in time when the interference is received by the receiving node 121.

In some embodiments, the receiving node 121 may maintain and keep updated statistics for the occurrence of the timing conditions for the received interference. For example, one counter may be associated with each timing condition to record the number of occurrences per timing condition. A time period may be defined in the receiving node 121 during which the statistics are collected. The counters may, for example, be normalized in order to provide the relative distribution in occurrence between the different timing conditions.

In some embodiments, the timing condition that the inference is received earlier than the reception of the transmission signal in the receiving node 121 may be deemed to be fulfilled when most data units of the transmission signal have at least their first data payload unit occurring after its preamble decoded incorrectly by the receiving node 121, while also having at least their last data payload unit occurring after its preamble decoded correctly by the receiving node 121. Also, in some embodiments, the timing condition that the inference is received later than the reception of the transmission signal in the receiving node 121 is deemed to be fulfilled when most data units of the transmission signal have at least their first data payload unit occurring after its preamble decoded correctly by the receiving node 121, while also having at least their last data payload unit occurring after its preamble decoded incorrectly by the receiving node 121. Furthermore, the timing condition that the inference is received at the same time as the reception of transmission signal in the receiving node 121 is deemed to be fulfilled when most data units of the transmission signal have at least their first data payload unit occurring after its preamble decoded incorrectly by the receiving node 121, while a received signal strength of the transmission signal is above a determined threshold in the receiving node 121. This means that the receiving node 121 may identify the timing conditions based on the pattern of the preamble and the decoding errors of the data payload units in the receiving node 121. This is also described below with reference to the example shown in FIG. 5.

It should be noted that, in the presence of interference, there is a higher probability that the preamble of a transmission signal is decoded correctly by the receiving node 121 than the subsequent data payload units. This is because the preamble is usually coded with the lowest Modulation and Coding Scheme, MCS, in order to maximize its robustness. However, the MCS of the data payload units are normally decided by Link Adaptation, LA. Often, the LA algorithms either rely on historical decoding statistics in the receiving node 121, or on feedback received from the receiving node 121. When the interference is very dynamic in time, the LA algorithms often have a hard time finding the optimum MCS for the transmission. Therefore, the data payload units received after the preamble in the receiving node 121 may, in the presence of interference, be decoded incorrectly and be lost.

Figure 5:
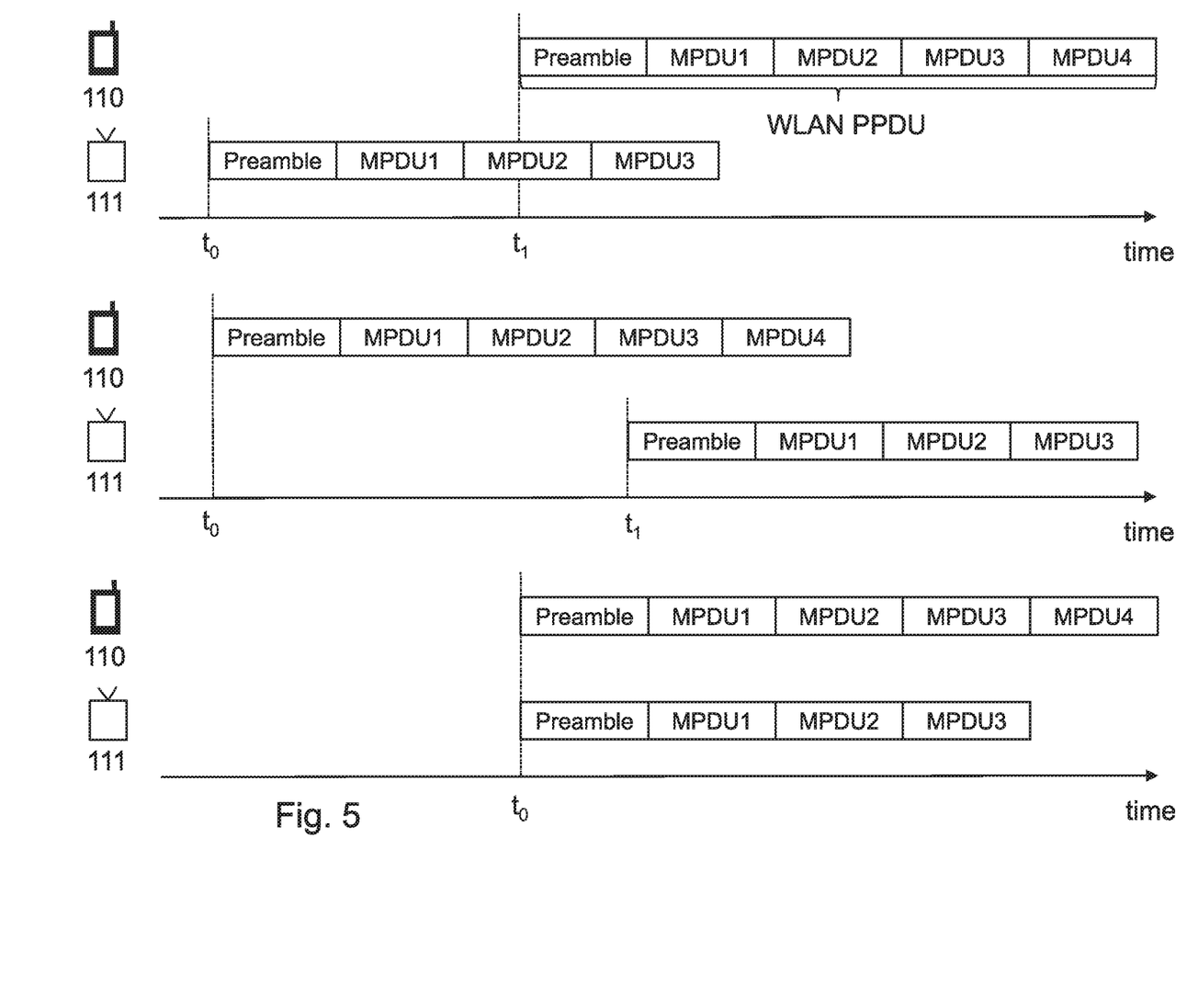
FIG. 5 is an illustration of different timing conditions according to embodiments of a transmitting node, an interfering node and a receiving node in a wireless communications network.

In some embodiments, the data units of the transmission signal may be WLAN PLCP packet data units, WLAN PPDUs. In this case, the data payload units may be aggregated MAC protocol data units, AMPDUs. A WLAN PPDU, WLAN PLCP protocol data unit, typically comprises a preamble and data payload. With frame aggregation, the data payload may be an AMPDU, Aggregate MAC protocol data unit, which comprises a number of MPDUs, MAC protocol data units. It should also be noted that without frame aggregation, the WLAN PPDU would contain only one MPDU. Examples of transmission signals having WLAN PPDUs comprising preambles and a number of aggregated MPDUs are shown in FIG. 5.

Action 402

After the determining in Action 401, the receiving node 121 transmits the determined information to the interfering node 111 and/or to the transmitting node 110. This means that the receiving node 121 may make the interfering node 111 aware of that its transmissions are causing packet loss in the receiving node 121 and/or the transmitting node 110 aware of how the inference causes packet loss in the receiving node 121 in the wireless communications network 100. In other words, if the packet loss in the receiving node 121 is due to aggressive spatial reuse by the transmitting node 110 and/or the interfering node 111, the receiving node 121 may inform the aggressive node to be more conservative in spatial reuse in order to avoid the interference.

The information may be transmitted by the receiving node 121 in a report message. The report message may, for example, be conveyed via new dedicated management, control or action frames transmitted from the receiving node 121, or be conveyed via existing management frames. Optionally, the report message may be conveyed by being comprised in MAC headers of data transmissions from the receiving node 121 to the transmitting node 110 and/or the interfering node 111. It should also be noted that the report message may not necessarily be transmitted directly to the transmitting node 110 and/or the interfering node 111, but may, for example, be relayed via another STA, AP or other node in the wireless communications network 100.

Furthermore, the transmission of the report message may also be event triggered or periodically transmitted in the receiving node 121. For example, in some embodiments, a threshold may be determined in the receiving node 121 such that a report message is sent once a statistics counter and/or the relative occurrence of a timing condition becomes equal to or larger than the determined threshold. According to another example, a periodical timer may be configured in the receiving node 121 such that a report message is sent when the periodical timer expires.

In some embodiments, in case the report message is to be sent to a transmitting node 110 within the same BSS, e.g. the first WLAN 135 in FIG. 1, management frame exchange procedures may be applied by the receiving node 121 in order to convey the report message. In some embodiments, in case the report message is to be sent to an interfering node 111 in another neighbouring BSS, e.g. the second WLAN 136 in FIG. 1, the receiving node 110 may broadcast the report message to the other neighbouring BSS and the interfering node 111. In some embodiments, the receiving node 121 may also use a common management entity, e.g. an AC, to relay the report message to the transmitting node 110 and/or the interfering node 111.

According to some embodiments, the information transmitted by the receiving node 121 may comprise the statistics as described above in Action 401. Alternatively, the information transmitted by the receiving node 121 may comprise an indication of which timing condition is the most dominant, i.e. relatively more frequently occurring than the other timing conditions. One example of such an indication may be a one bit flag being used to represent each identified timing condition, i.e. the flag may be set to true when a particular timing condition has been identified as the most dominant one by the receiving node 121.

FIG. 5 shows an illustration of an example of timing conditions according to embodiments of the transmitting node 110, the interfering node 111, and the receiving node 121. First, it should be remembered that, according to existing WLAN standards, a WLAN node should defer from accessing the channel if an ongoing transmission signal is detected, which may be performed by correctly decoding a preamble of the transmission signal, and the received transmission signal power is above a sensing threshold, e.g. CCAT. While it may be possible for the WLAN node to raise its sensing threshold in order to increase spatial reuse, this may also increase the probability of decoding errors due to high interference in the WLAN. In order to resolve this issue, the transmitting node 110, the interfering node 111, and the receiving node 121 may identify three different timing conditions which depend on the received order of transmission signal and the interference signal.

According to a first timing condition, as illustrated by the upper part of FIG. 5, the interference signal from the interfering node 111 is received before the transmission signal from the transmitting node 110 in the receiving node 121. The interference signal from the interfering node 111 is received at time $t_0$ and the transmitting signal from the transmitting node 110 is received at time $t_1$. This timing condition implies that the transmitting node 110 does not defer from channel access based on the interference signal from the interfering node 111. This may occur when the received signal strength of the interference signal at the transmitting node 110 is less than the sensing threshold configured in the transmitting node 110, or when the interference signal is not detected at all by the transmitting node 110.

The first timing condition may be detected by receiving node 121 by first checking if there is an ongoing interference when the transmission signal is received. In some embodiments, the interference may be detected by receiving node 121 checking its NAV timer status. If the NAV timer of the receiving node 121 is running and it has been set by an OBSS transmission signal, an ongoing interference signal is detected. In some embodiments, such an OBSS transmission signal may be identified by receiving node 121 by checking the color field in the PHY header. Optionally, in some embodiments, the PHY header of the Partial AID field may be decoded by receiving node 121, which provides information on the BSS-ID and the AID value. If the read BSS-ID value is identical to the BSS-ID of the transmitting node 110 or the receiving node 121 node itself, the detected signal may be defined by receiving node 121 as an OBSS transmission signal. Once an interference signal is detected, the receiving node 121 may check the decoding error of the first one or several consecutive MPDUs; if the first one or several consecutive MPDUs are not decoded correctly, then the interference signal may be the cause of the decoding error and the first timing condition may be detected by the receiving node 121.

According to a second timing condition, as illustrated by the middle part of FIG. 5, the transmission signal from the transmitting node 110 is received before the interference signal from the interfering node 111 in the receiving node 121. The transmitting signal from the transmitting node 110 is received at time $t_0$ and the interference signal from the interfering node 111 is received at time $t_1$. This timing condition implies that the interfering node 111 does not defer from channel access based on the transmission signal from the transmitting node 110. This may occur when the received signal strength of the transmission signal at the interfering node 111 is less than the sensing threshold configured in the interfering node 111, or when the transmission signal is not detected at all by the interfering node 111.

If there is no ongoing interference when the transmission signal is received, the second timing condition may be detected by receiving node 121. This may be performed by the receiving node 121 checking the decoding error of the first one or several consecutive MPDUs; if the first one or several consecutive MPDUs are decoded correctly and the last one or several consecutive MPDUs are decoded incorrectly, then the interference signal may be the cause of the decoding error and the second timing condition may be detected by the receiving node 121.

According to a third timing condition, as illustrated by the lower part of FIG. 5, the transmission signal from the transmitting node 110 is received at the same time as the interference signal from the interfering node 111 in the receiving node 121. The transmitting signal from the transmitting node 110 and the interference signal from the interfering node 111 are both received at time $t_0$. This timing condition indicate a collision between the transmission signal from the transmitting node 110 and the interference signal from the interfering node 111. This implies that the transmitting node 110 and the interfering node 111 draw the same random number for back-off. This may, however, also occur in case the interfering node 111 is from the same BSS, e.g. another STA in WLAN 135.

If the first one or several consecutive MPDUs are lost when the receiving node 121 checks the decoding error of the first one or several consecutive MPDUs, the third timing condition may also be detected by receiving node 121. In some embodiments, the receiving node 121 may identify if the decoding error is due to low signal strength or high interference. In some embodiments, a RSSI, Received Signal Strength Indicator, of the transmission signal may be checked by the receiving node 121; if the RSSI level is deemed to be sufficiently high to be able to decode the data payload units, e.g. based on the anticipated packet decoding error rates for the given SINR, MCS, etc., then the decoding error may be determined by the receiving node 121 to be due to high interference. Hence, if the decoding error is deemed to be caused by the interference signal, the third timing condition, i.e. a collision, is detected by the receiving node 121. In some embodiments, a RCPI, Received Channel Power Indicator, may be used by the receiving node 121 instead of RSSI.

It should also be noted that in case AM PDUs, i.e. MPDU aggregation, are not used in the wireless communications network 100, each WLAN PPDU will only comprise one MPDU. This means that only the third timing condition will be able to be detected by the receiving node 121 in this case.

Figure 6:
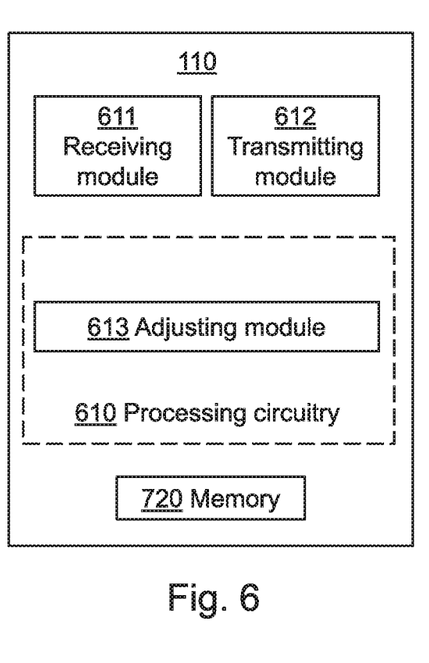
FIG. 6 is a block diagram depicting embodiments of a transmitting node.

To perform the method actions in the transmitting node 110 for reducing interference in a wireless communications network 100, the transmitting node 110 may comprise the following arrangement depicted in FIG. 6. FIG. 6 shows a schematic block diagram of embodiments of a transmitting node 110.

The transmitting node 110 may comprise a processing circuitry 610, a memory 620 and at least one antenna (not shown). The processing circuitry 610 may comprise a receiving module 611 and a transmitting module 612. The receiving module 611 and the transmitting module 612 may comprise Radio Frequency, RF, circuitry and baseband processing circuitry. The receiving module 611 and the transmitting module 612 may also form part of a transceiver. In particular embodiments, some or all of the functionality described above as being performed by the transmitting node 110 may be provided by the processing circuitry 610 executing instructions stored on a computer-readable medium, such as the memory 620 shown in FIG. 6. Alternative embodiments of the wireless device 121 may comprise additional components, such as, the adjusting module 613, responsible for providing its functionality necessary to support the embodiments described herein.

The transmitting node 110 or processing circuitry 610 is configured to, or may comprise the receiving module 611 configured to, receive information indicating that inference caused by an interfering node 111 to a transmission signal from the transmitting node 110 fulfills a timing condition relative to the reception of the transmission signal in a receiving node 121 in the wireless communications network 100. The transmitting node 110 or processing circuitry 610 is also configured to, or may comprise the adjusting module 611 configured to, adjust one or more transmission parameters in the transmitting node 110 based on the received information.

In some embodiments, the timing condition is that the inference is received earlier than the reception of the transmission signal in the receiving node 121. Optionally, the timing condition is that the inference is received at the same time as the reception of the transmission signal in the receiving node 121, or that the inference is received later than the reception of the transmission signal in the receiving node 121.

When the timing condition indicates that the inference is received earlier than the transmission signal in the receiving node 121, the transmitting node 110 or processing circuitry 610 may be configured to, or may comprise the adjusting module 611 configured to, adjust one or more transmission parameters by decreasing a channel sensing threshold, and/or increase the transmission power of transmission signals from the transmitting node 110. Optionally, when the timing condition indicates that the inference is received later than the reception of transmissions in the receiving node 121, the transmitting node 110 or processing circuitry 610 may be configured to, or may comprise the adjusting module 611 configured to adjust one or more transmission parameters by initiate an Request-to-Transmit/Clear-to-Transmit, RTS/CTS, procedure in the wireless communications network 100, and/or increase the transmission power of transmission signals from the transmitting node 110. According to another option, when the timing condition indicates that the inference is received at the same time as the reception of the transmission signal in the receiving node 121, the transmitting node 110 or processing circuitry 610 may be configured to, or may comprise the adjusting module 611 configured to adjust one or more transmission parameters by increasing a contention window size in the transmitting node 110.

Figure 7:
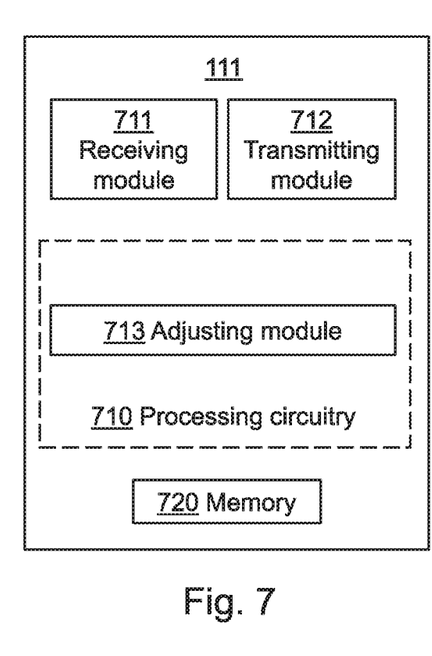
FIG. 7 is a block diagram depicting embodiments of an interfering node.

To perform the method actions in the interfering node 111 for reducing interference in a wireless communications network 100, the interfering node 111 may comprise the following arrangement depicted in FIG. 7. FIG. 7 shows a schematic block diagram of embodiments of an interfering node 111.

The interfering node 111 may comprise a processing circuitry 710, a memory 720 and at least one antenna (not shown). The processing circuitry 710 may comprise a receiving module 711 and a transmitting module 712. The receiving module 711 and the transmitting module 712 may comprise Radio Frequency, RF, circuitry and baseband processing circuitry. The receiving module 711 and the transmitting module 712 may also form part of a transceiver. In particular embodiments, some or all of the functionality described above as being performed by the interfering node 111 may be provided by the processing circuitry 710 executing instructions stored on a computer-readable medium, such as the memory 720 shown in FIG. 7. Alternative embodiments of the wireless device 121 may comprise additional components, such as, the adjusting module 713, responsible for providing its functionality necessary to support the embodiments described herein.

The interfering node 111 or processing circuitry 710 is configured to, or may comprise the receiving module 711 configured to, receive information indicating that inference caused by the interfering node 111 to a transmission signal from a transmitting node 110 fulfills a timing condition relative to the reception of the transmission signal in a receiving node 121 in the wireless communications network 100. The interfering node 111 or processing circuitry 710 is also configured to, or may comprise the adjusting module 711 configured to, adjust one or more transmission parameters in the interfering node 111 based on the received information.

In some embodiments, the timing condition is that the inference is received earlier than the reception of the transmission signal in the receiving node 121. Optionally, the timing condition is that the inference is received at the same time as the reception of the transmission signal in the receiving node 121, or that the inference is received later than the reception of the transmission signal in the receiving node 121.

When the timing condition indicates that the inference is received earlier than the transmission signal in the receiving node 121, the interfering node 111 or processing circuitry 710 may be configured to, or may comprise the adjusting module 711 configured to, adjust one or more transmission parameters by initiating an Request-to-Transmit/Clear-to-Transmit, RTS/CTS, procedure in the wireless communications network 100, and/or decreasing the transmission power of transmission signals from the interfering node 111. Optionally, when the timing condition indicates that the inference is received later than the reception of transmissions in the receiving node 121, the interfering node 111 or processing circuitry 710 may be configured to, or may comprise the adjusting module 711 configured to adjust one or more transmission parameters by decreasing a channel sensing threshold, and/or decreasing the transmission power of transmission signals from the interfering node 111. According to another option, when the timing condition indicates that the inference is received at the same time as the reception of the transmission signal in the receiving node 121, the interfering node 111 or processing circuitry 710 may be configured to, or may comprise the adjusting module 711 configured to adjust one or more transmission parameters by increasing a contention window size in the interfering node 111.

Figure 8:
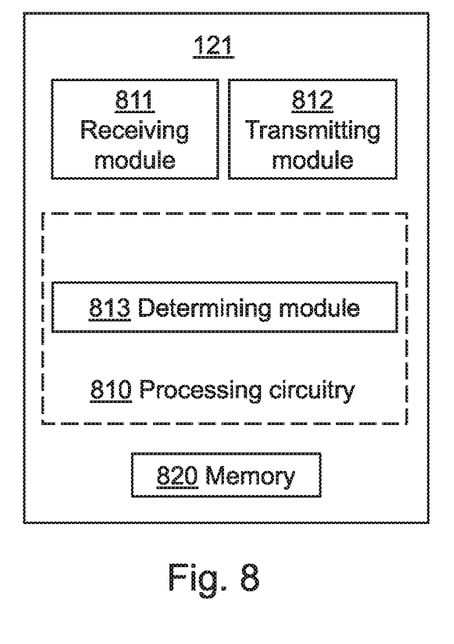
FIG. 8 is a block diagram depicting embodiments of a receiving node.

To perform the method actions in the receiving node 121 for reducing interference in a wireless communications network 100, the receiving node 121 may comprise the following arrangement depicted in FIG. 8. FIG. 8 shows a schematic block diagram of embodiments of a receiving node 121.

The receiving node 121 may comprise a processing circuitry 810, a memory 820 and at least one antenna (not shown). The processing circuitry 810 may comprise a receiving module 811 and a transmitting module 812. The receiving module 811 and the transmitting module 812 may comprise Radio Frequency, RF, circuitry and baseband processing circuitry. The receiving module 811 and the transmitting module 812 may also form part of a transceiver. In particular embodiments, some or all of the functionality described above as being performed by the receiving node 121 may be provided by the processing circuitry 810 executing instructions stored on a computer-readable medium, such as the memory 820 shown in FIG. 8. Alternative embodiments of the wireless device 121 may comprise additional components, such as, the determining module 813, responsible for providing its functionality necessary to support the embodiments described herein.

The receiving node 121 or processing circuitry 810 is configured to, or may comprise the determining module 813 configured to, determine information indicating that inference caused by an interfering node 111 to a transmission signal from a transmitting node 110 fulfills a timing condition relative to the reception of the transmission signal in the receiving node 121. The receiving node 121 or processing circuitry 810 is also configured to, or may comprise the transmitting module 812 configured to, transmit the determined information to the interfering node 111 and/or to the transmitting node 110.

In some embodiments, the timing condition is that the inference is received earlier than the reception of the transmission signal in the receiving node 121. Optionally, the timing condition is that the inference is received at the same time as the reception of the transmission signal in the receiving node 121, or that the inference is received later than the reception of the transmission signal in the receiving node 121.

In some embodiments, the timing condition that the inference is received earlier than the reception of the transmission signal in the receiving node 121 may be deemed to be fulfilled when most data units of the transmission signal have at least their first data payload unit occurring after its preamble decoded incorrectly, while also having at least their last data payload unit occurring after its preamble decoded correctly. In some embodiments, the timing condition that the inference is received later than the reception of the transmission signal in the receiving node 121 is deemed to be fulfilled when most data units of the transmission signal have at least their first data payload unit occurring after its preamble decoded correctly, while also having at least their last data payload unit occurring after its preamble decoded incorrectly. In some embodiments, the timing condition that the inference is received at the same time as the reception of transmission signal in the receiving node 121 is deemed to be fulfilled when most data units of the transmission signal have at least their first data payload unit occurring after its preamble decoded incorrectly, while a received signal strength of the transmission signal is above a determined threshold.

According to some embodiments, the data units of the transmission signal may be WLAN PLCP packet data units, WLAN PPDUs, and the data payload units are aggregated MAC protocol data units, AMPDUs. Furthermore, in some embodiments, the wireless communications network 100 operates in an unlicensed spectrum.

Furthermore, the embodiments for reducing interference in a wireless communications network 100 described above may be implemented through one or more processors, such as, the processing circuitry 610 in the transmitting node 110 depicted in FIG. 6, the processing circuitry 710 in the interfering node 111 depicted in FIG. 7, and the processing circuitry 810 in the receiving node 121 depicted in FIG. 8, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 510 in the transmitting node 110, the processing circuitry 710 in the interfering node 111, or the processing circuitry 810 in the receiving node 121, respectively. The computer program code may e.g. be provided as pure program code in the transmitting node 110, the interfering node 111, and the receiving node 121, or on a server and downloaded to the transmitting node 110, the interfering node 111, and the receiving node 121, respectively. Thus, it should be noted that the modules of the transmitting node 110, the interfering node 111, and the receiving node 121 may in some embodiments be implemented as computer programs stored in memory, e.g. in the memory modules 620, 720, 820 in FIGS. 6-8, for execution by processors, e.g. the processing modules 610, 710, 810 of FIGS. 6-8

Those skilled in the art will also appreciate that the processing circuitry 610, 710, 810 and the memory 620, 720, 820 described above may, respectively, refer to a combination of analog and digital circuits, and/or one or more processors configured with software and/or firmware, e.g. stored in a memory, that when executed by the one or more processors such as the processing circuitry 610, 710, 810 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

ABBREVIATIONS

WLAN Wireless Local Access Network
AP Access point
STA Station
SINR Signal to Interference plus Noise Ratio
MCS Modulation and Coding Scheme
PHY Physical
MAC Medium Access Control
BSS Basic Serving Set
OBSS Overlapping Basic Serving Set
CCAT Clear Channel Assessment Threshold
LA Link Adaptation
RTS Request to Send
CTS Clear to Send
PHY Physical
MPDU MAC Protocol Data Unit
AMPDU Aggregate MAC Protocol Data Unit
PLCP PHY Layer Convergence Procedure
PPDU PLCP Protocol Data Unit
RSSI Received Signal Strength Indicator
RCPI Received Channel Power Indicator

The invention claimed is:

1. A method performed by a transmitting node for reducing interference in a wireless communications network, the method comprising
receiving information, from a receiving node, indicating fulfillment of a timing condition, wherein the timing condition indicates a relative timing between reception of the following signals by the receiving node:

a transmission signal transmitted by the transmitting node, and
an interfering signal transmitted by an interfering node; and
adjusting one or more transmission parameters in the transmitting node based on the received information.

2. The method according to claim 1, wherein the timing condition indicates one of the following:
a portion of the interfering signal was received earlier than the transmission signal;
the beginning of the interfering signal and the beginning of the transmission signal were received at the same time; and
a portion of the transmission signal was received earlier than the interfering signal.

3. The method according to claim 2, wherein, when the timing condition indicates that the portion of the interfering signal was received earlier than the transmission signal, the adjusting comprises at least one of the following:
decreasing a channel sensing threshold; and
increasing the transmission power of transmission signals from the transmitting node.

4. The method according to claim 2, wherein, when the timing condition indicates that the portion of the transmission signal was received earlier than the interfering signal, the adjusting comprises at least one of the following:
initiating a Request-to-Transmit/Clear-to-Transmit, RTS/CTS, procedure in the wireless communications network; and
increasing the transmission power of transmission signals from the transmitting node.

5. The method according to claim 2, wherein, when the timing condition indicates that the beginning of the interfering signal and the beginning of the transmission signal were received at the same time, the adjusting comprises increasing a contention window size in the transmitting node.

6. A transmitting node configured to reduce interference in a wireless communications network, the transmitting node comprising:
a transceiver;
processing circuitry operably coupled to the transceiver; and
a memory storing computer-executable instructions that, when executed by the processing circuitry, configure the transmitting node to:
receive information, from a receiving node, indicating fulfillment of a timing condition, wherein the timing condition indicates a relative timing between reception of the following signals by the receiving node:
a transmission signal transmitted by the transmitting node, and
an interfering signal transmitted by an interfering node; and
adjust one or more transmission parameters in the transmitting node based on the received information.

7. The transmitting node according to claim 6, wherein the timing condition indicates one of the following:
a portion of the interfering signal was received earlier than the reception of the transmission signal;
the beginning of the interfering signal and the beginning of the transmission signal were received at the same time; and
a portion of the transmission signal was received earlier than the interfering signal.

8. The transmitting node according to claim 7, wherein when the timing condition indicates that the portion of the interfering signal was received earlier than the transmission signal, execution of the instructions configures the transmitting node to adjust one or more transmission parameters by at least one of the following:
decreasing a channel sensing threshold; and
increasing the transmission power of transmission signals from the transmitting node.

9. The transmitting node according to claim 7, wherein when the timing condition indicates that the portion of the transmission signal was received earlier than the interfering signal, execution of the instructions configures the transmitting node to adjust one or more transmission parameters by at least one of the following:
initiating a Request-to-Transmit/Clear-to-Transmit, RTS/CTS, procedure in the wireless communications network; and
increasing the transmission power of transmission signals from the transmitting node.

10. The transmitting node according to claim 7, wherein when the timing condition indicates that the beginning of the interfering signal and the beginning of the transmission signal were received at the same time, execution of the instructions configures the transmitting node to adjust one or more transmission parameters by increasing a contention window size in the transmitting node.

11. A method performed by an interfering node for reducing interference in a wireless communications network, the method comprising
receiving information, from a receiving node, indicating fulfillment of a timing condition, wherein the timing condition indicates a relative timing between reception of the following signals by the receiving node:
a transmission signal transmitted by a transmitting node, and
an interfering signal transmitted by the interfering node; and
adjusting one or more transmission parameters in the interfering node based on the received information.

12. The method according to claim 11, wherein the timing condition indicates one of the following:
a portion of the interfering signal was received earlier than the transmission signal;
the beginning of the interfering signal and the beginning of the transmission signal were received at the same time; and
a portion of the transmission signal was received earlier than the interfering signal.

13. The method according to claim 12, wherein, when the timing condition indicates that the portion of the interfering signal was received earlier than the transmission signal, the adjusting comprises at least one of the following:
initiating a Request-to-Transmit/Clear-to-Transmit, RTS/CTS, procedure in the wireless communications network; and
decreasing the transmission power of transmission signals from the interfering node.

14. The method according to claim 12, wherein, when the timing condition indicates that the portion of the transmission signal was received earlier than the interfering signal, the adjusting comprises at least one of the following:
decreasing a channel sensing threshold; and
decreasing the transmission power of transmission signals from the interfering node.

15. The method according to claim 12, wherein, when the timing condition indicates that the beginning of the interfering signal and the beginning of the transmission signal were received at the same time, the adjusting comprises increasing a contention window size in the interfering node.

16. An interfering node configured to reduce interference in a wireless communications network, the interfering node comprising:
a transceiver;
processing circuitry operably coupled to the transceiver; and
a memory storing computer-executable instructions that, when executed by the processing circuitry, configure the interfering node to:
receive information, from a receiving node, indicating fulfillment of a timing condition, wherein the timing condition indicates a relative timing between reception of the following signals by the receiving node:
a transmission signal transmitted by a transmitting node, and
an interfering signal transmitted by the interfering node; and
adjust one or more transmission parameters in the interfering node based on the received information.

17. The interfering node according to claim 16, wherein the timing condition indicates one of the following:
a portion of the interfering signal was received earlier than the transmission signal;
the beginning of the interfering signal and the beginning of the transmission signal were received at the same time; and
a portion of the transmission signal was received earlier than the interfering signal.

18. The interfering node according to claim 17, wherein, when the timing condition indicates that the portion of the interfering signal was received earlier than the transmission signal, execution of the instructions configures the interfering node to adjust one or more transmission parameters by at least one of the following:
initiating a Request-to-Transmit/Clear-to-Transmit, RTS/CTS, procedure in the wireless communications network; and
decreasing the transmission power of transmission signals from the interfering node.

19. The interfering node according to claim 17, wherein, when the timing condition indicates that the portion of the transmission signal was received earlier than the interfering signal, execution of the instructions configures the interfering node to adjust one or more transmission parameters by at least one of the following:
decreasing a channel sensing threshold; and
decreasing the transmission power of transmission signals from the interfering node.

20. The interfering node according to claim 17, wherein, when the timing condition indicates that the beginning of the interfering signal and the beginning of the transmission signal were received at the same time, execution of the instructions configures the interfering node to adjust one or more transmission parameters by increasing a contention window size in the interfering node.

21. A method performed by a receiving node for reducing interference in a wireless communications network, the method comprising:
determining that a timing condition is fulfilled, wherein the timing condition indicates a relative timing between reception of the following signals by the receiving node:
a transmission signal transmitted by a transmitting node, and
an interfering signal transmitted by an interfering node; and
transmitting information indicating the fulfilled timing condition to at least one of the following: the interfering node and the transmitting node.

22. The method according to claim 21, wherein the timing condition indicates one of the following:
a portion of the interfering signal was received earlier than the transmission signal;
the beginning of the interfering signal and the beginning of the transmission signal were received at the same time; and
a portion of the transmission signal was received earlier than the interfering signal.

23. The method according to claim 22, wherein the timing condition that the portion of the interfering signal was received earlier than the transmission signal is determined to be fulfilled when most data units of the transmission signal have at least their first data payload unit occurring after its preamble decoded incorrectly, while also having at least their last data payload unit occurring after its preamble decoded correctly.

24. The method according to claim 22, wherein the timing condition that the portion of the transmission signal was received earlier than the interfering signal is determined to be fulfilled when most data units of the transmission signal have at least their first data payload unit occurring after its preamble decoded correctly, while also having at least their last data payload unit occurring after its preamble decoded incorrectly.

25. The method according to claim 22, wherein the timing condition that the beginning of the interfering signal and the beginning of the transmission signal were received at the same time is determined to be fulfilled when most data units of the transmission signal have at least their first data payload unit occurring after its preamble decoded incorrectly, while a received signal strength of the transmission signal is above a determined threshold.

26. A receiving node configured to reduce interference in a wireless communications network, the receiving node comprising:
a transceiver;
processing circuitry operably coupled to the transceiver; and
a memory storing computer-executable instructions that, when executed by the processing circuitry, configure the receiving node to:
determine that a timing condition is fulfilled, wherein the timing condition indicates a relative timing between reception of the following signals by the receiving node:
a transmission signal transmitted by a transmitting node, and
an interfering signal transmitted by an interfering node; and
transmit information indicating the fulfilled timing condition to at least one of the following: the interfering node and the transmitting node.

27. The receiving node according to claim 26, wherein the timing condition indicates one of the following:
a portion of the interfering signal was received earlier than the transmission signal;
the beginning of the interfering signal and the beginning of the transmission signal were received at the same time; and
a portion of the transmission signal was received earlier than the interfering signal.

28. The receiving node according to claim 27, wherein the timing condition that the portion of the interfering signal was received earlier than the transmission signal is determined to be fulfilled when most data units of the transmission signal have at least their first data payload unit occurring after its preamble decoded incorrectly, while also having at least their last data payload unit occurring after its preamble decoded correctly.

29. The receiving node according to claim 27, wherein the timing condition that the portion of the transmission signal was received earlier than the interfering signal is determined to be fulfilled when most data units of the transmission signal have at least their first data payload unit occurring after its preamble decoded correctly, while also having at least their last data payload unit occurring after its preamble decoded incorrectly.

30. The receiving node according to claim 27, wherein the timing condition that the beginning of the interfering signal and the beginning of the transmission signal were received at the same time is determined to be fulfilled when most data units of the transmission signal have at least their first data payload unit occurring after its preamble decoded incorrectly, while a received signal strength of the transmission signal is above a determined threshold.

\* \* \* \* \*